June 6, 1950 G. H. BROWN 2,510,796
ART OF PASTEURIZING MILK, ETC
Filed Sept. 28, 1944 2 Sheets-Sheet 1
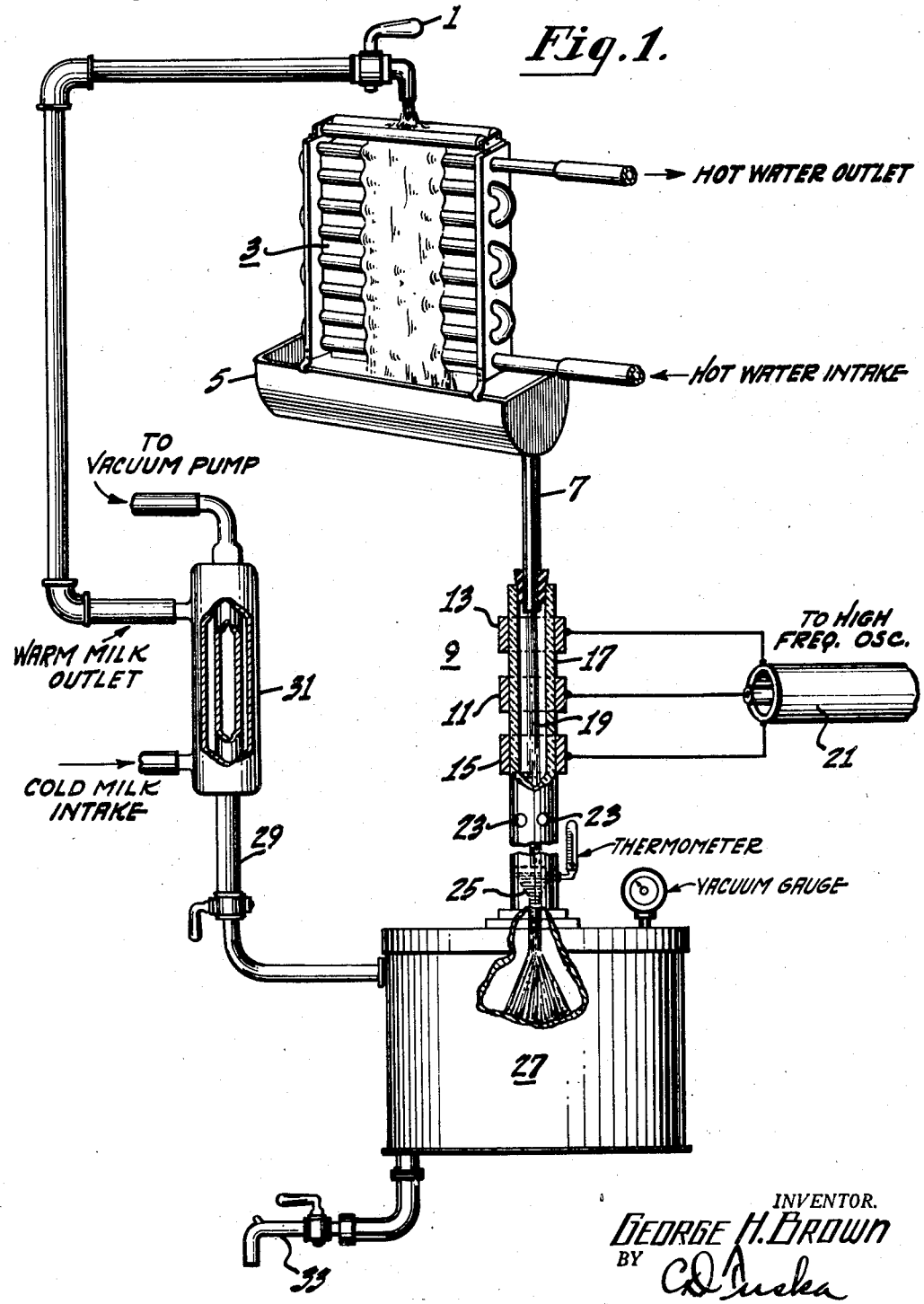
INVENTOR.
GEORGE H. BROWN
BY
ATTORNEY

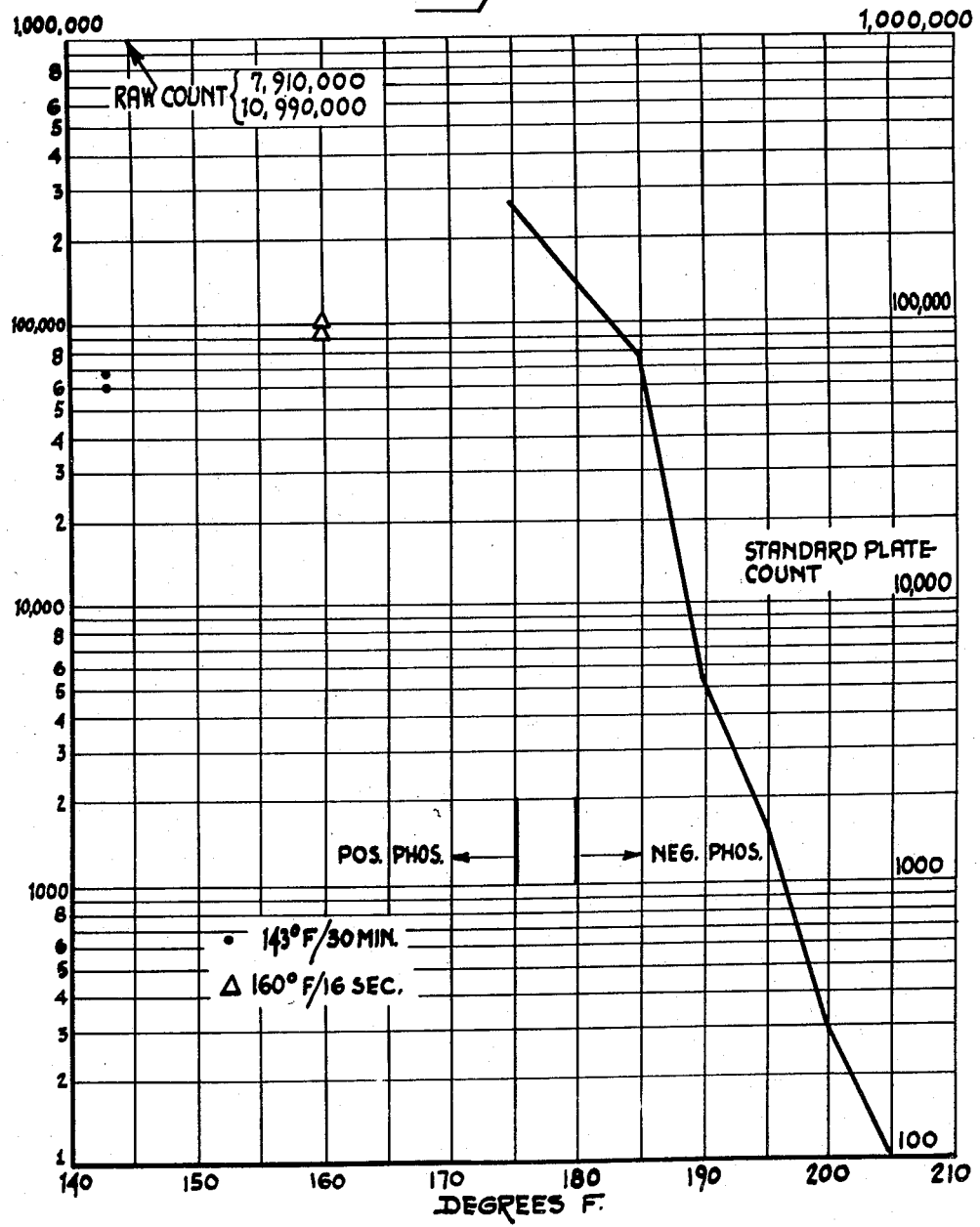

Patented June 6, 1950

2,510,796

UNITED STATES PATENT OFFICE 2,510,796

ART OF PASTEURIZING MILK, ETC.

George H. Brown, Princeton, N. J., assignor to Radio Corporation of America, a corporation of Delaware Application September 28, 1944, Serial No. 556,264

4 Claims. (Cl. 99—253)

This invention relates to the sterilization or pasteurization of milk or other liquids and fluent materials.

In the usual or "holder method" of pasteurization, milk is heated to a temperature of 143° Fahrenheit and held at this temperature for 30 minutes. The milk is then cooled for storage or bottling. The bacteria content is usually reduced to about one percent of the starting value. If times less than 30 minutes are used the bacteria content is noticeably greater. When a longer time is used, a cooked flavor is usually present and the apparent cream volume is reduced. While the most pathogenic bacteria in milk are destroyed by this standard treatment the pasteurization temperature employed is nearly optimum for the growth of certain thermophilic bacteria, while many thermoduric bacteria, such as *Bacillus subtilis*, survive the treatment quite well.

So called "S. T. H. T." (short-time, high-temperature) methods, in which the milk is heated quickly to 161° F. and held at that temperature for not less than 15 seconds, have been the subject of experiment for some time. In some cases, the milk is spread in a thin film on heated plates and quickly pumped over cooling plates. In an analogous (short time) process, the milk is passed between two electrodes to which 60 cycle voltage is applied. Since milk is a good conductor (resistivity of 200 ohms for a centimeter cube) current flows through the milk and generates heat. Difficulties with the electrodes have kept this method from becoming popular. (Carbon electrodes are somewhat porous and the minute particles of matter which are retained in the pores thereof may affect the flavor of the milk. When metal electrodes, including those constituted of stainless steel and coin silver, are employed, pronounced darkening followed by the formation of a greenish substance takes place about the metal.)

In methods employing a pasteurization temperature of 161° F., 16 seconds appears to be the longest time at which milk may be held at this temperature without altering its taste and apparent cream volume, and even under ideal conditions the bacteria count may be, and usually is, higher than it is in milk pasteurized by the more conventional holder method.

Accordingly, the principal object of the present invention is to provide a novel, highly effective, and extremely rapid electrical method of and apparatus for sterilizing or pasteurizing milk and other beverages or fluent matter and this, too, without altering the taste or nutritive values of such materials.

Another and related object of the invention is to provide a novel "flash" method of heating a continuous flow of milk or other liquid to a temperature which is positively lethal to bacteria, as by means of radio frequency energy, and one which in its practice dispenses with the use (and disadvantages incident to the use) of carbon or other "contact" electrodes.

Other objects and advantages, together with certain preferred details of construction and procedure, will be apparent and the invention itself will be best understood by reference to the following specification and to the accompanying drawing, wherein:

Fig. 1 is a schematic view, partly in section, of one form of apparatus which may be employed in practicing the "flash" pasteurization method of the present invention, and Fig. 2 is a chart illustrative of the results (in terms of bacteria count) achieved with the present invention, as compared with prior art methods.

Stated briefly, the foregoing and other objects are achieved in accordance with the invention by projecting a stream of the liquid to be treated through a high frequency field of an intensity sufficient to heat it, for a fraction of a second only, to a temperature which may approach the boiling point of the liquid and which in any event is positively lethal to most bacteria. The temperatures which may be employed in pasteurizing milk in accordance with the invention are preferably not less than 175° F. and no higher than about 212° F., and the period during which the milk is subjected to such a temperature is preferably substantially less than one second. A temperature of about 205° F. ensures thorough pasteurization of milk and, at the same time, allows a commercially satisfactory tolerance or avoidance of temperatures in excess of the boiling point (212.3° F.).

The required rapid cooling is preferably effected by admitting the hot liquid stream into a vacuum chamber which, conveniently, may be mounted adjacent to the radio frequency applicator in line with the nozzle or pipe from which the liquid is projected into the electric field.

The duration of the heating and cooling cycles determine the apparent cream volume and the taste of milk. A total absence of any cooked flavor is achieved, in accordance with the invention, when milk is first heated to a temperature within the indicated range and then cooled to a temperature of 135° F. or less, all within a period of about one second or less.

In the interest of economy, the raw milk or other untreated liquid is preferably preheated, by any conventional means, to a temperature of, say, 140° F. before being subjected to the electric field. Thus, as shown in the drawing, raw milk from a source exemplified by the faucet 1 may be flowed over a hot water coil 3 and the warm milk collected in a trough or reservoir 5 having an outlet pipe 7 therein which leads directly to the electric field applicator, indicated generally at 9.

The applicator 9 is preferably of the type shown in copending application Serial No. 556,265 of Rudolph A. Bierwirth, filed concurrently herewith, and wherein the separate electrodes, here designated 11, 13, and 15, and the glass tube 17 or other support for the said electrodes are so designed, positioned and arranged that the jet or stream 19 of liquid from the pipe or nozzle 7 may be projected through the electric field between the electrodes without coming in contact with any part of the applicator. (As explained in the Bierwirth application, there is thus no danger of overheating the outer or peripheral portion of the stream, as would be the case if the fluid flowed in contact with the inner surface of the conduit 17.)

In the instant case, the stream of milk 19 is circular in cross-section and the electrodes 11, 13, and 15 comprise three metal rings or bands arranged one above the other in collinear and symmetrical relation about the stream. If desired, however, the milk may be projected from the pipe 7 in the form of ribbon made up of one or more streams of milk, in which case, if desired, the electrodes may comprise two or more pairs of flat metal plates (not shown) arranged one pair above the others and with the electrodes of each pair opposite one another and parallel to the major faces of the ribbon. In any event, the energy supplied to the electrodes from a suitable source of radio frequency energy, here exemplified by the concentric transmission line 21, should be of an intensity sufficient to heat the milk, within the area circumscribed by the electric field, instantaneously to a temperature which is lethal to any pathogenic organisms or other undesired matter therein. As previously set forth, a temperature of about 205° F. is recommended for commercial installations. The quantity of radio frequency power required to achieve such a temperature is discussed elsewhere in this specification.

While the electric field may be applied to the fluid stream 19 in vacuo, it is usually preferable to maintain the ambient about the stream at atmospheric pressure. In the latter case, the conduit 17 through which the stream is passed may be provided with one or more vents 23 and, below the vent, with a funnel 25 into the mouth of which the stream 19 is directed. The mouth of the funnel, being normally filled with the liquid, serves as a vacuum tight seal between the vacuum cooling system and the open conduit 17.

The cooling system shown in Fig. 1 comprises a chamber 27 which is connected to a vacuum pump (not shown) through a pipe 29 and a vertically arranged cooling jacket or condenser 31. As indicated by the legend on this drawing, the condenser may be cooled by flowing cold raw milk through a first passage between the walls of the condenser and thence out to the faucet 1 of the preheater 3. In passing through the condenser 31, the milk is heated to a certain extent by the hot vapor in an adjacent second passage which communicates through pipe 29 with the vacuum chamber 27.

The temperature to which milk or other fluid is cooled by admitting it into a vacuum chamber depends upon the degree of vacuum maintained in the said chamber, and in this connection it may be noted that a vacuum of the order of 32 millimeters of mercury corresponds to a temperature of about 86° F., one of 85 millimeters of mercury corresponds to about 117° F. and 132 millimeters of mercury corresponds to about 135° F.

The hot milk entering the vacuum chamber is cooled because some of the energy is used in vaporizing part of the water in the milk. The water vapor is drawn out of the chamber by the vacuum pump. Since it is not usually desirable to remove any water from the milk, the condenser is mounted in the vertical direction so that the condensate runs back into the chamber 27 through the pipe 29 and is mixed with the milk before being drawn off through the valve 33.

The percentage of water removed by evaporation may be calculated from the equation:

Percentage of water lost by $$\text{Evaporation} = \frac{\Delta F}{9.7}$$

where $\Delta F$ is the difference in temperature between the hot milk entering the vacuum chamber and the boiling temperature established by the degree of vacuum, expressed in degrees Fahrenheit. Where the milk entering has a temperature of 205 degrees and the milk is cooled to, say, 86 degrees, 12.2 percent of its volume would be lost if it were not caught and returned by the condenser.

The electrical energy requirements calculated from the specific heat of milk are approximately the same as observed in reducing the invention to practice, i. e.:

Energy (watt-minutes per quart) $= 36.7 \Delta F$ where $\Delta F$ is the temperature increment obtained with radio frequency. If milk is preheated to 140° F. and radio frequency power is used to elevate the temperature to 205° F., the temperature increment is 65 degrees, and the energy required is 2380 watt-minutes per quart. Thus, one kilowatt of power will pasteurize 25.2 quarts per hour and a 100-kilowatt oscillator will pasteurize 2520 quarts or 5040 pounds per hour. If the conservatively high figure of six dollars per hour is taken to cover depreciation of the oscillator, tube replacements and power cost, pasteurization by means of radio frequency power costs about one-eighth of a cent per pound. This neglects the cost of preheating, since this must be done irrespective of the particular pasteurization method employed.

The radio-frequency of the electric energy employed in practicing the invention is by no means critical and may comprise any convenient frequency of from about 20 megacycles per second and upward. The results charted in Fig. 2 of the drawings were achieved with the oscillator tuned to a frequency of the order of 30 megacycles per second.

In the chart of Fig. 2 the ordinate is calibrated in terms of bacteria (standard plate count) and the abscissa is marked in degrees Fahrenheit to designate a wide range of milk pasteurization temperatures. The bacteria count of raw milk from a single source was 7,910,000 and 10,990,000.

(These two samples were taken at the same time. The variation is usual in biological assays.) As indicated by the two dots, when a sample of this milk was pasteurized by the conventional holder method (i. e. 143° F./30 minutes) the bacteria count was reduced to about 60,000 per cubic centimeter. As indicated by the two triangular indicia, the bacteria count of milk from the same batch when pasteurized by a "S. T. H. T." electrical method (160° F. for 16 seconds) was of the order of 90,000 to 100,000. On the other hand, and as shown by the solid line, the same raw milk pasteurized by the radio frequency "flash method" of the present invention at the recommended temperature of 205° F. showed a bacteria count of only 100. In this case the time it took to raise the temperature of the milk from its pre-heated temperature of about 135° F. to the pasteurization temperature of 205° F. was estimated to be about 0.067 of a second, and the cooling time was estimated to be 0.2 of a second.

The legends "Pos. Phos." and "Neg. Phos." on Fig. 2 refer to the phosphatase tests which were made on each sample. The phosphatase test is highly regarded by health authorities as a quick means of determining that milk has been heated. The status of the enzymes changes at temperatures determined by the holding time. It is quite possible to have a high bacteria count with a negative phosphatase record. However, it is used as a test method a great deal so that it is most desirable that any new technique yields a negative phosphatase reaction. Such a negative reaction was achieved, and this fact is indicated on Fig. 2.

It will now be apparent that the present invention provides an extremely rapid and highly effective method and apparatus for pasteurizing milk and other beverages.

What is now claimed is:

1. Apparatus for the treatment of milk and other fluids comprising a reservoir for said fluid, a vacuum cooling chamber mounted in spaced relation with respect to said reservoir, means for projecting fluid from said reservoir through said space into said vacuum chamber, electrodes spaced from and mounted in capacitive relation to said projected fluid intermediate said reservoir and said vacuum chamber for applying a high frequency electric field to said fluid in its passage through said space, said high frequency electric field serving to heat fluid rapidly to a temperature which approaches its boiling point, said vacuum chamber serving to rapidly cool said fluid and to vaporize a portion thereof, and a condenser having a first passage through which said fluid to be processed passes to said reservoir and a second passage adjacent said first passage and communicating with said vacuum chamber, said vapors being received into said second passage to preheat said fluid in said first passage and to be condensed and returned to said vacuum chamber.

2. Apparatus for pasteurizing milk comprising means for pre-heating the milk to a temperature of about 140° F., a reservoir for said pre-heated milk, and having an outlet from which the milk emerges in the form of a continuous jet, an electric field applicator having electrodes spaced from and mounted about the path of said jet and adapted to heat said jet, in passing, to a temperature of about 205° F., a chamber into which said hot milk is received, means for establishing and maintaining a vacuum of the order of from 132 to 32 millimeters of mercury in said chamber, said chamber serving to rapidly cool said milk and to vaporize a portion thereof, and a condenser, said condenser having a first passage through which said milk to be pasteurized passes to said means for preheating, and a second passage adjacent said first passage and communicating with said vacuum chamber, said vapors being received into said second passage to preheat said milk in said first passage and to be condensed and returned to said chamber.

3. Apparatus for the treatment of milk and other liquids comprising a reservoir for the liquid to be treated, said reservoir having an outlet through which said liquid emerges under the influence of gravity in the form of a continuous stream, electrode means mounted to be spaced from and in capacitive relation with respect to said stream adjacent to said outlet for subjecting said liquid to radio frequency energy, an evacuable cooling chamber having an inlet for said liquid mounted in the path of said stream beneath said electrodes, and a condenser communicating with said cooling chamber to condense vapors produced by said cooling chamber and to return the condensate thereto.

4. Apparatus for pasteurizing milk and other liquids comprising, a reservoir for the unpasteurized liquid, an evacuable cooling chamber for the pasteurized liquid mounted in spaced relation with respect to said reservoir, means for directing a stream of liquid from said reservoir through said space into said cooling chamber, electrode means mounted in said space in capacitive relation with respect to said stream and spaced therefrom for applying radio frequency energy to said liquid of value of the order of:

$$E = 36.7 \Delta F$$

where $E$ = energy, in terms of watt-minutes per quart, and $\Delta F$ is the temperature increment in degrees Fahrenheit required to heat said liquid to a temperature in the range of 175° F. to 212° F.

means for establishing and maintaining a vacuum of the order of from 132 to 32 millimeters of mercury in said evacuable cooling chamber, and a cooling jacket through which said last-named means is coupled to said cooling chamber, said cooling jacket serving to condense vapors caused by vacuum cooling of said liquid flowing into said cooling chamber.

GEORGE H. BROWN.

REFERENCES CITED

The following references are of record in the file of this patent:

UNITED STATES PATENTS

| Number | Name | Date |
|---|---|---|
| 1,692,874 | Templeton | Nov. 27, 1928 |
| 1,900,573 | McArthur | Mar. 7, 1933 |
| 1,934,704 | Golden | Nov. 14, 1933 |
| 1,945,867 | Rawls | Feb. 6, 1934 |
| 1,972,050 | Davis | Aug. 28, 1934 |
| 1,992,515 | Uhlmann | Feb. 26, 1935 |
| 2,081,243 | Macy | May 25, 1937 |
| 2,100,327 | Getchell | Nov. 30, 1937 |
| 2,119,616 | Wightman et al. | June 7, 1938 |
| 2,170,196 | Grindrod | Aug. 22, 1939 |
| 2,331,895 | Dunmire | Oct. 19, 1943 |
| 2,382,033 | Supplee et al. | Aug. 14, 1945 |